United States Patent [19]

Ayres et al.

[11] Patent Number: 4,512,721
[45] Date of Patent: Apr. 23, 1985

[54] VACUUM INSULATED STEM INJECTION TUBING

[75] Inventors: Paul S. Ayres, Alliance; Burton D. Ziels, Lancaster; Chou-Ming Chen, Louisville, all of Ohio

[73] Assignee: The Babcock & Wilcox Company, New Orleans, La.

[21] Appl. No.: 413,285

[22] Filed: Aug. 31, 1982

[51] Int. Cl.³ ............................................. F04B 37/02
[52] U.S. Cl. ...................................... 417/51; 166/57; 417/53
[58] Field of Search .......................... 166/57, 302, 303; 417/48, 53, 49, 51

[56] References Cited

U.S. PATENT DOCUMENTS

| | | | |
|---|---|---|---|
| 3,680,631 | 8/1972 | Allen et al. | 166/242 X |
| 3,720,267 | 3/1973 | Allen et al. | 166/57 X |
| 3,763,935 | 10/1973 | Perkins | 166/57 X |
| 3,994,340 | 11/1976 | Anderson et al. | 166/57 |
| 4,146,497 | 3/1979 | Barosi et al. | 417/48 X |

Primary Examiner—Edward K. Look
Attorney, Agent, or Firm—Robert J. Edwards; James C. Simmons

[57] ABSTRACT

Tubular apparatus for delivering steam or other hot fluids to an oil well comprises an inner tubular having an outer surface and defining an inner space for conveying fluids at a temperature greater than 400 degrees F., and an outer tubular disposed around the inner tubular and defining an annular space with the inner and the outer tubulars being connected together. The annular space is closed to atmospheric pressure. A vacuum is established within the annular space. A getter material for absorbing at least one active gas is disposed within the annular space. Active gases which are absorbed by the getter material include hydrogen formed by corrosion of the outer tubular which hydrogen migrates through the outer tubular into the annular space and gases such as nitrogen, carbon monoxide, and hydrogen that are released from the inner tubular at elevated temperatures.

6 Claims, 2 Drawing Figures

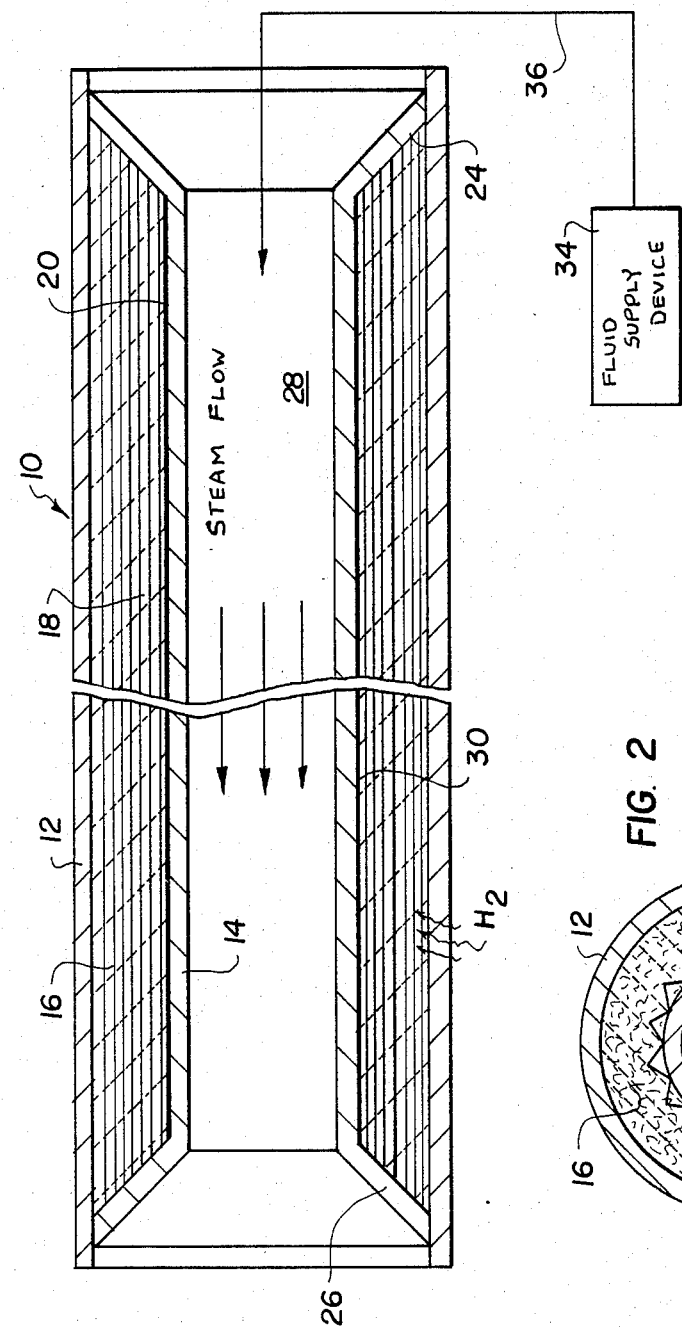
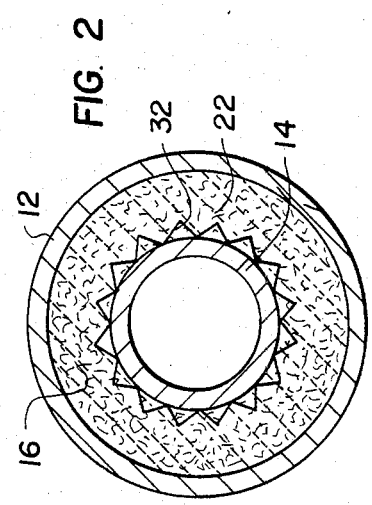
FIG. 1
FIG. 2

VACUUM INSULATED STEM INJECTION TUBING

FIELD AND BACKGROUND OF THE INVENTION

The present invention relates in general to insulated hot fluid injection tubing and more particularly to a new and useful arrangement for maintaining a vacuum in an annular space between inner and outer tubulars forming an insulated tubing.

Heavy oil and tar sands represent huge uptapped resources of liquid hydrocarbons which will be produced in increasing quantities to help supplement declining production of conventional crude oil. The deposits must, however, be heated to reduce the oil viscosity before the oil will flow to the producing wells in economical quantities. A dominant method of heating is by injection of surface generated steam in either a continuous (steam flood) or intermittent (steam stimulation or "huff and puff") mode.

When steam is injected down long injection pipes or "strings", a significant amount of thermal energy is lost to the rock overburden (500 to 7,000 feet) which covers the oil deposits if the strings are not properly insulated. In initial steam injection projects, the price of oil did not justify the prevention of this heat loss, but with the price of oil at $30 or more a barrel, insulation systems for the well injection pipe become economically justified.

It is known to use insulated steam injection tubing for the injection of steam into oil wells and the prevention of excessive heat loss.

Tubing of the insulated steam injection type is formed of coaxial inner and outer tubulars that are connected together whereby an annular space is formed therebetween. The annular spaces are typically insulated by products such as fiber and layered insulation with air or inert gas typically in the annular spaces.

The provision of a vacuum within an annular space between inner and outer tubulars is disclosed in U.S. Pat. No. 3,680,631 to Allen et al. and U.S. Pat. No. 3,763,935 to Perkins. Both of these references deal with the conveyance of warm fluid, such as oil over cool environments such as permafrost zones wherein the fluid, specifically liquid petroleum, is to be conveyed typically at a temperature of 160 degrees F.

Both of these patents suggest the use of special coatings, such as nickel or chromium alloy coatings, on the tubular surfaces to reduce gas diffusion into the space so that the vacuum which is originally established in the annular space can be maintained. Both patents generally suggest the use of a getter material for absorbing gases which may invade the annular space.

While the problem of gases diffusing or leaking into an evacuated annular space of a double walled tube is treated generally in the Allen et al and Perkins patents, neither of these patents address additional problems which are faced in the rugged environment of an oil well undergoing steam injection. The outer surfaces of the outer tubular in such an environment are exposed to corrosive water under pressure, which pressure increases with well depth. The tubing is generally made of carbon steel for economic reasons, and the corrosive environment drastically increases the generation of nascent hydrogen that permeates the outer tubular wall in particular at the greatly increased pressures encountered in typical water depths of 4000 to 6000 feet or more.

In addition, under the high temperature conditions of the inner tubular, the outgassing of objectionable gases such as oxygen, carbon monoxide, hydrogen, and nitrogen into the annular space increases in the order of an estimated ten times or more over the outgassing rate when the fluid in the inner tubular is at a temperature of merely 160 degrees F. Again, for economic reasons, the inner tubular should normally be made of relatively inexpensive metals such as carbon steel. While baking is known for the purposes of outgassing the surface of such steel, it is estimated that sufficient degassing of the inner tubular would require a temperature of 1,800 degrees F. for a period of about a day. Such processing is generally impractical, however.

During the life of an insulated steam injection tubing, which is estimated to be at least five years, an increase in hydrogen partial pressure within the annular space of up about four torr can be expected due to hydrogen diffusion. An increase in partial pressure from other active gases of 100 torr can be expected from outgassing of the inner tubular. Such increases in pressure defeat the insulating function of the annular space. Although partial pressures of other gases of up to 0.1 torr can normally be tolerated, a partial pressure above 0.01 torr cannot normally be tolerated for hydrogen due to its greater mobility.

In an article entitled *New Double-Walled Tubulars Can Aid Thermal-Recovery Operations*, B. V. Traynor, Oil and Gas Journal, Feb. 18, 1980, the problems of insulating the annular spaces of double-walled tubing in a rugged oil well environment are discussed on p. 106. It is noted that the use of a vacuum in the annular space for insulation purposes was found to be economically impractical so that the vacuum approach has been abandoned.

SUMMARY OF INVENTION

The present invention provides a solution to the problems of maintaining a vacuum in the annular spaces of tubing having inner and outer tubulars and used to inject steam into an oil well.

According to the invention, getter material is placed in the annular space during assembly of the tubulars. The getter material is advantageously positioned adjacent a surface which will achieve a high temperature during service. This increases the capacity and pumping speed of the getter material. The inner and outer tubulars are assembled using connecter means such as plates which are welded to the tubulars whereby an annular space is provided therebetween. The space is sealed and evacuated. The getter material is preferably simply and automatically activated by heating when the tubing is utilized for steam injection.

Accordingly, an object of the present invention is to provide a tubular apparatus for the delivery of steam or other hot fluids to a well comprising an inner tubular having an outer surface and defining an inner space for conveying fluids at a temperature of greater than 400 degrees F., an outer tubular disposed around the inner tubular and defining an annular space therewith, means for connecting the inner and outer tubulars, the annular space closed to atmospheric pressure and a vacuum established in the closed annular space, and a getter material for absorbing at least one active gas in the closed annular space, the getter material being disposed preferably adjacent the surface of the inner tubular or another high temperature component in the apparatus.

A further object of the present invention is to provide such a tubular apparatus whereby an acceptable vacuum may be maintained in the annular space when the inner tubular is made of material which releases at least one active gas by outgassing, which outgassing is increased with elevated temperatures.

A further object of the present invention is to provide such a tubular apparatus whereby an acceptable vacuum may be maintained in the annular space when the outer tubular is made of material which corrodes in a corrosive environment of a well to generate nascent hydrogen which penetrates the outer tubular and enters the annular space.

The invention advantageously can help avoid the use of costly corrosion resistant materials as coatings for the inner and outer tubulars.

The getter material may be made of titanium, zirconium, or other gas absorbing materials. However, titanium and zirconium are preferred for absorbing hydrogen gas.

A further object of the invention is to provide a tubular apparatus for the delivery of steam to a well in which a vacuum environment used for insulation is maintained within desired limits throughout the life of the tubular apparatus, and which is simply designed, rugged in construction, and economical to manufacture.

For an understanding of the principles of the invention, reference is made to the following description of a typical embodiment thereof as illustrated in the accompanying drawings.

BRIEF DESCRIPTION OF THE DRAWINGS

In the Drawings:

FIG. 1 is a longitudinal sectional view of insulated steam injection tubing according to the invention; and FIG. 2 is a cross-sectional view of another embodiment of the insulated steam injection tubing according to the invention.

DESCRIPTION OF THE PREFERRED EMBODIMENTS

Referring to the drawings, in particular, the invention embodied therein comprises an insulated hot fluid injection tubing apparatus generally designated 10, which apparatus can be assembled with other similar tubing to form a string which is lowered into an oil well for the purposes of injecting steam or other hot fluids therein. The tubing 10 is typically about 40 feet in length and comprises an outer tubular 12 disposed around an inner tubular 14 and defining therewith an annular space 16. Annular space 16, as shown in FIG. 1, can be provided with multi-layered insulation 18 wrapped around an outer surface 20 of inner tubular 14, or, as shown in FIG. 2, fibrous insulation 22. However, other suitable insulation may be used. Connecting means such as flanged connecting members 24 and 26 are connected, preferably welded, between the inner and outer tubulars at axially spaced locations. In addition to connecting inner and outer tubulars, members 24 and 26 may serve to advantageously seal the annular space 16. A fluid supply device 34 may be connected to tubing 10 by means of the line schematically illustrated at 36 to supply steam or other hot fluid to the tubing. Device 34 may be of any type known in the art for that purpose, and such devices are commonly known to those of ordinary skill in the art to which this invention pertains.

Annular space 16 is vacated in known fashion to a level preferably at or below $10^{-3}$ torr.

With an estimated service life of about five years or longer, it is desired that this level of vacuum be maintained at or below 0.1 torr including a partial pressure below 0.01 torr for hydrogen. Above these pressures, the thermal insulating function of the annular space is degraded. This is due, in the case of hydrogen, to the light weight and fast movement of hydrogen molecules that undesirably transfer heat from the inner tubular 14 to the outer tubular 12. The vacuum, as noted above, also deteriorates due to outgassing of active gases such as oxygen, nitrogen, hydrogen, and carbon monoxide from the material of the tubulars, in particular the inner tubular 14 which is exposed to steam conducted in its inner space 28, which inner tubular is typically at a temperature of about 650 degrees F. and generally within a temperature range of 400 to 700 degrees F.

As will be discussed in greater detail hereafter, during service life of a tubular apparatus 10, the atmosphere within annular space 16 can be expected to increase by up to about four torr due to diffusing hydrogen generated by corrosion, and by about 100 torr due to outgassing of gases from the hot inner tubular 14. Thus, even without otherwise mechanical leakage of gases into the annular space which may occur, the upper limits at a total pressure of 0.1 torr and a hydrogen partial pressure of 0.01 torr for the annular space 16 is far exceeded.

To eliminate such undesirable active gases from the annular space 16, and according to the invention, a getter material 30 is provided within the annular space and preferably adjacent the outer surface 20 of inner tubular 14 or another surface such as the surface of a connecting member 24 or 26 which may also be at a temperature of more than 400 degrees F. In this location, the getter material which is preferably activatable by heat of steam in space 28, absorbs both hydrogen permeating through the outer tubular wall and gases outgassed from the inner tubular 14. To increase the surface area of the getter material, the getter material can, for example, advantageously be of a sponge form which is a form providing a large surface area and is commonly known to those of ordinary skill in the art to which this invention pertains, or it may be provided on a corrugated metal strip, shown at 32 in FIG. 2; that surrounds and is adjacent the outer surface of inner tubular 14. The corrugated strip 32 may, for example, be iron or another metallic alloy, with the getter material formed in a coating on the strip.

The getter material is advantageously titanium, an alloy of titanium, zirconium or an alloy of zirconium for absorption of hydrogen as well as other active gases. Getter material such as aluminum may be added for absorbing other active gases. These getter materials may be activated, or increased in activity at elevated temperatures, typically the temperatures within space 28, to absorb the objectionable active gases that would otherwise migrate into space 16.

In this way, relatively inexpensive mild carbon steel can be used for constructing inner and outer tubulars without corrosion resistant diffusion coatings such as chromium or nickel plating or stainless steel. This results in significant "savings" in manufacturing of the tubular apparatus 10 while at the same time maintaining a sufficient vacuum insulation during its service life.

While the tubing is primarily useful in the rugged environments of an oil well for oil recovery, the tubing is also useful in other similarly rugged environments such as those of oil-coal slurry transportation and steam and high pressure hot water circulation in geothermal wells.

In calculating the amount of hydrogen which may permeate into the annular space 16, an outer surface of outer tubular 12 is assumed to have an area of 232.7 cm.$^2$ per inch of tube length. The water volume in the annular space between the well casing (not shown in FIG. 1) and the insulated tube is assumed to be 369.86 cm.$^3$ per inch of the tube length. The volume of the evacuated space 16 in the insulated tube is assumed to be 133.27 cm.$^3$ per inch of the tube length. These figures are based on typical sizes for the inner and outer tubulars.

The density of carbon steel, of a type advantageously used according to the invention, is 7.86 g/cm.$^3$.

A corrosion mechanism in acid or alkali solution is as follows:

$Fe \rightarrow Fe^{2+} + 2e$: anodic reaction $2H^+ + 2e \rightarrow H_2(gas)$: cathodic reaction Corrosion of 1 g-ion of Fe (55.85 g) evolves 1 g-mole of $H_2$.

In addition to the above, the following assumptions are made:
Corrosion rate of carbon steel: 1 mpy (mil per year)
Outer surface area of the insulated tube: 91.16 cm$^2$ per inch of tube.
Inner surface area (exposed to steam) of the inner tubular: 48.12 cm$^2$ per inch of tubular.
Wall thickness of the outer tubular: 0.635 cm.
Wall thickness of the inner tubular: 0.483 cm.

Permeation coefficient U can be calculated according to the equation $$U = U_o e(-K/RT)$$

where
$U_o = 2.83 \times 10^{-3}$ cm$^3$/cm-sec-atm$^{\frac{1}{2}}$
$K = 8,400$ cal/g-mole.,
$R$ = the universal gas constant, and
$T$ = temperature in degrees Kelvin.

At temperatures of 150, 400, and 650 degrees F., the permeation coefficient U is found to be as follows:
$U$150 degrees F. $= 1.1 \times 10^{-8}$ cm$^3$/cm-sec-atm$^{\frac{1}{2}}$
$U$400 degrees F. $= 4.1 \times 10^{-7}$ cm$^3$/cm-sec-atm$^{\frac{1}{2}}$
$U$650 degrees F. $= 2.95 \times 10^{-6}$ cm$^3$/cm-sec-atm$^{\frac{1}{2}}$ The hydrogen partial pressure in the steam side of the inner insulated tubular is assumed to be zero. With $Q_1$ being the hydrogen flux from water to the vacuum space of the insulated tube, and $Q_2$ being the hydrogen flux from the vacuum space of the insulated tube to the steam, the steady state condition is $Q_1 = Q_2$.

Q is calculated according to the following equation:

$$Q = \frac{A \cdot U \cdot p^{\frac{1}{2}}}{t} \text{ (cm}^3\text{/sec.)}$$

where
A = surface area in cm$^2$
P = the difference in pressure in atmospheres between inside and outside of a tubular, and
t = thickness in cm. of the tubular wall.

Based on the above assumptions and setting $Q_1 = Q_2$, the partial pressure of hydrogen in the vacuum space of the insulated tube under steady-state conditions is estimated for an inner tubular temperature in the range of 400 to 650 degrees F. to be as listed in Table I or greater.

TABLE I
HYDROGEN PARTIAL PRESSURE AS A FUNCTION OF DISTANCE BELOW WATER SURFACE

| Depth (ft) | H$_2$ Partial Pressure (Torr.) |
|---|---|
| 0 | $2.1 \times 10^{-2}$ |
| 500 | $3.2 \times 10^{-1}$ |
| 1000 | $6.4 \times 10^{-1}$ |
| 2000 | 1.27 |
| 4000 | 2.55 |
| 6000 | 3.82 |

From this table, it may be observed that the annulus pressure due to permeation of hydrogen into the annulus under steady-state conditions is unacceptably high (above 0.01 torr) even at the water surface if an effective means is not provided for absorbing the hydrogen gas.

While various corrosion inhibitors can be utilized to inhibit corrosion or prevent the passage of hydrogen into the vacuum space as noted above, this increases the cost of using insulated tubing.

By using titanium or zirconium, each of which have a strong affinity for hydrogen gas, as a hydrogen getter in a vacuum space, hydrogen as well as other gases can be absorbed from the vacuum space to prolong the useful life of the insulated tubing according to the invention.

The reaction of titanium as a hydrogen getter is as follows:

$$Ti(s) + H_2(g) \rightarrow TiH_2(s)$$

(s) signifies a solid and (g) signifies gas

The free energy of formation and the dissociation pressure of titanium hydride are shown as a function of temperature in Table II. The large negative value of free energy and the low dissociation pressure indicate that titanium can serve as an efficient hydrogen getter in the vacuum space of the insulated tube.

TABLE II
FREE ENERGY OF FORMATION AND DISSOCIATION PRESSURE OF TITANIUM HYDRIDE AS A FUNCTION OF TEMPERATURE

| Temperature (degrees F.) | Free Energy of Formation (cal) | Dissociation Pressure of TiH$_2$ (Atm.) |
|---|---|---|
| 80 | −25,067 | $10^{-18.3}$ |
| 260 | −28,845 | $10^{-11.9}$ |
| 400 | −20,813 | $10^{-9.5}$ |
| 440 | −18,518 | $10^{-8.1}$ |
| 620 | −15,144 | $10^{-6.0}$ |
| 650 | −10,579 | $10^{-5.2}$ |

Assuming the service life of tubing 10 to be about five years, and to preserve a final vacuum within annular space 16 of no more than 0.1 torr including a hydrogen partial pressure no more than 0.01 torr, this space should first be evacuated to a level of $10^{-3}$ torr or less as noted above. Assuming hydrogen will contribute a partial pressure of about four torr and all of the gases will contribute about 100 torr pressure, the use of a getter material within the annular space should maintain the vacuum level at the end of the service life of the tube well below 0.1 torr including a hydrogen partial pressure no more than 0.01 torr.

While specific embodiments of the invention have been shown and described in detail to illustrate the application of the principles of the invention, it will be understood that this invention may be embodied otherwise without departing from such principles.

What is claimed is:

1. Apparatus for the delivery of hot fluids to a well comprising:
   an inner tubular having an outer surface and defining an inner space adapted for conveying fluids at a temperature within the range of about 400 to 700 degrees F.;
   means for supplying fluid to said inner tubular within said temperature range which fluid supply means is connected to said inner tubular;
   an outer tubular disposed around said inner tubular and defining an annular space therewith;
   said inner and outer tubulars are composed of steel, exclusive of corrosion resistant coatings;
   insulation disposed in said annular space;
   means for connecting said inner and outer tubulars so that said annular space is closed to atmospheric pressure and a vacuum may be established in said closed annular space; and
   a getter material for absorbing at least one active gas in said closed annular space, said getter material is activatable at a temperature within said temperature range, said getter material is disposed in said closed annular space between said insulation and said outer surface of said inner tubular and adjacent said outer surface of said inner tubular, and said getter material includes at least one of the group consisting of titanium, an alloy of titanium, zirconium, and an alloy of zirconium.

2. Apparatus according to claim 1 wherein said insulation comprises one of the group consisting of fibrous insulation and layered insulation.

3. Apparatus according to claim 1 wherein said connecting means comprises at least two connecting members spaced apart in an axial direction of said inner and outer tubulars and welded to said inner and outer tubulars, and said inner space is adapted for carrying steam.

4. A tube according to claim 1 including a metal strip which carries said getter material which metal strip surrounds and is adjacent said inner tubular.

5. A method of maintaining a vacuum in the annular space of a tubular apparatus formed of an inner tubular which carries fluids at a temperature within the range of about 400 to 700 degrees F. and an outer tubular connected to the inner tubular by connector means to form the annular space between the inner and outer tubulars wherein the inner and outer tubulars are composed of steel, exclusive of corrosion resistant coatings, comprising closing the annular space to atmospheric pressure, providing insulation in the annular space, providing in said annular space adjacent an outer surface of said inner tubular and between said outer surface and said insulation a getter material, and selecting said getter material from the group consisting of titanium, an alloy of titanium, zirconium, and an alloy of zirconium which getter material is activatable at a temperature within said temperature range for absorbing active gasses which move into the annular space thorough hydrogen permeation of the outer tubular due to corrosion of the outer tubular and outgassing of the inner tubular due to the elevated temperature of the inner tubular.

6. A method according to claim 5 wherein the step of providing in said annular space a getter material includes positioning a metal strip around and adjacent said inner tubular for carrying said getter material.

* * * * *

REEXAMINATION CERTIFICATE (4007th)

United States Patent [19]
Ayres et al.

[11] B1 4,512,721

[45] Certificate Issued Mar. 7, 2000

[54] VACUUM INSULATED STEAM INJECTION TUBING

[75] Inventors: Paul S. Ayres, Alliance; Burton D. Ziels, Lancaster; Chou-Ming Chen, Louisville, all of Ohio

[73] Assignee: The Babcock & Wilcox Company, New Orleans, La.

Reexamination Request:
No. 90/005,011, Jun. 8, 1998

Reexamination Certificate for:
Patent No.: 4,512,721
Issued: Apr. 23, 1985
Appl. No.: 06/413,285
Filed: Aug. 31, 1982

[51] Int. Cl.[7] ..................................................... F04B 37/02
[52] U.S. Cl. .................................. 417/51; 417/53; 166/57
[58] Field of Search .................................. 417/51, 53, 48, 417/49; 166/57, 302, 303

[56] References Cited

U.S. PATENT DOCUMENTS

| | | |
|---|---|---|
| 2,118,428 | 5/1938 | Chrisman . |
| 2,289,401 | 7/1942 | Yost . |
| 2,693,026 | 11/1954 | Simpelaar . |
| 2,828,537 | 4/1958 | Pischke et al. . |
| 2,924,245 | 2/1960 | Wilson . |
| 2,937,527 | 5/1960 | Mason et al. . |
| 3,023,495 | 3/1962 | Noland . |
| 3,041,717 | 7/1962 | Brown . |
| 3,047,937 | 8/1962 | De Vecchi . |
| 3,146,005 | 8/1964 | Peyton . |
| 3,149,513 | 9/1964 | Dollens . |
| 3,156,042 | 11/1964 | Reed . |
| 3,203,901 | 8/1965 | Della Porta . |
| 3,232,638 | 2/1966 | Hollander . |
| 3,246,394 | 4/1966 | Meyer . |
| 3,256,482 | 6/1966 | Rosso . |
| 3,397,345 | 8/1968 | Dunlavey . |
| 3,408,130 | 10/1968 | Fransen et al. . |
| 3,412,714 | 11/1968 | Michel . |
| 3,428,557 | 2/1969 | Rivers . |
| 3,451,479 | 6/1969 | Parker . |
| 3,478,783 | 11/1969 | Doyle . |

(List continued on next page.)

FOREIGN PATENT DOCUMENTS

| | | |
|---|---|---|
| 424 105 | 1/1926 | Germany . |
| 1 064 304 | 8/1959 | Germany . |
| 1 258 215 | 1/1968 | Germany . |
| 1 583 992 | 6/1971 | Germany . |
| 55-141322 | 5/1980 | Japan . |
| 1 455 425 | 11/1976 | United Kingdom . |
| 2 099 049 | 12/1982 | United Kingdom . |
| 2 121 505 | 12/1983 | United Kingdom . |

OTHER PUBLICATIONS

"New Double–Walled Tubulars Can Aid Thermal–Recovery Operations," B.V. Traynor, *Oil and Gas Journal*, Feb. 18, 1980, pp. 103–107.

"Permeability Measurements with Gaseous Hydrogen for Various Steels," H. L. Eschbach, F. Gross and S. Schulien, publication and date unknown.

"Hydrogen Permeation through Metals," J.K. Gorman and W.R. Nardella, publication unknown, Jan., 1962 (approx.).

(List continued on next page.)

*Primary Examiner*—Charles G. Freay

[57] ABSTRACT

Tubular apparatus for delivering steam or other hot fluids to an oil well comprises an inner tubular having an outer surface and defining an inner space for conveying fluids at a temperature greater than 400 degrees F., and an outer tubular disposed around the inner tubular and defining an annular space with the inner and the outer tubulars being connected together. The annular space is closed to atmospheric pressure. A vacuum is established within the annular space. A getter material for absorbing at least one active gas is diposed within the annular space. Active gases which are absorbed by the getter material include hydrogen formed by corrosion of the outer tubular which hydrogen migrates through the outer tubular into the annular space and gases such as nitrogen, carbon monoxide, and hydrogen that are released from the inner tubular at elevated temperatures.

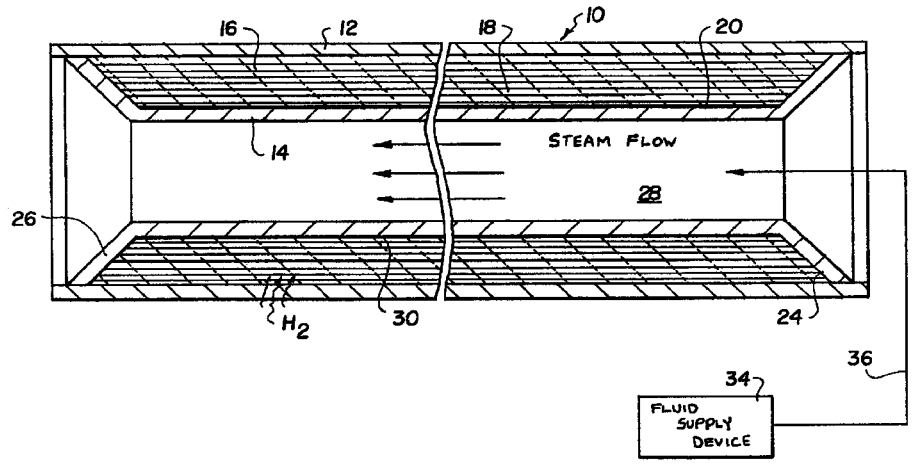

U.S. PATENT DOCUMENTS

| | | |
|---|---|---|
| 3,511,282 | 5/1970 | Willhite et al. . |
| 3,548,992 | 12/1970 | Dawson . |
| 3,571,907 | 3/1971 | Watson . |
| 3,574,357 | 4/1971 | Alexandru . |
| 3,608,631 | 9/1971 | Allen et al. . |
| 3,608,640 | 9/1971 | Willhite et al. . |
| 3,609,062 | 9/1971 | Zucchinelli et al. . |
| 3,654,691 | 4/1972 | Willhite et al. . |
| 3,680,631 | 8/1972 | Allen et al. . |
| 3,693,665 | 9/1972 | Veerling et al. . |
| 3,720,267 | 3/1973 | Allen et al. . |
| 3,762,995 | 10/1973 | Gulbransen et al. . |
| 3,763,935 | 10/1973 | Perkins . |
| 3,794,358 | 2/1974 | Allen et al. . |
| 3,810,491 | 5/1974 | Hildebrandt . |
| 3,845,662 | 11/1974 | Surgina et al. . |
| 3,850,715 | 11/1974 | Jebens et al. . |
| 3,863,328 | 2/1975 | Arntz . |
| 3,896,042 | 7/1975 | Anderson et al. . |
| 3,911,963 | 10/1975 | Denoor et al. . |
| 3,926,832 | 12/1975 | Barosi . |
| 3,963,826 | 6/1976 | Anderson et al. . |
| 3,994,340 | 11/1976 | Anderson . |
| 3,994,341 | 11/1976 | Anderson et al. . |
| 4,043,387 | 8/1977 | Lamp . |
| 4,069,303 | 1/1978 | Yamadaya et al. . |
| 4,071,335 | 1/1978 | Barosi . |
| 4,082,834 | 4/1978 | Grossman et al. . |
| 4,088,456 | 5/1978 | Giorgi et al. . |
| 4,111,689 | 9/1978 | Liu . |
| 4,125,924 | 11/1978 | Goetze et al. . |
| 4,130,301 | 12/1978 | Dunham . |
| 4,139,024 | 2/1979 | Adorjan . |
| 4,142,509 | 3/1979 | Hermann . |
| 4,146,497 | 3/1979 | Barosi et al. . |
| 4,157,779 | 6/1979 | Ishii et al. . |
| 4,160,014 | 7/1979 | Gamo et al. . |
| 4,163,666 | 8/1979 | Shaltiel et al. . |
| 4,203,049 | 5/1980 | Kuus . |
| 4,228,145 | 10/1980 | Gamo et al. . |
| 4,269,211 | 5/1981 | Howard et al. . |
| 4,272,259 | 6/1981 | Patterson . |
| 4,272,988 | 6/1981 | Phillips et al. . |
| 4,273,146 | 6/1981 | Johnson . |
| 4,278,466 | 7/1981 | de Pous . |
| 4,283,226 | 8/1981 | van Mal . |
| 4,297,082 | 10/1981 | Wurtz et al. . |
| 4,306,887 | 12/1981 | Barosi et al. . |
| 4,307,612 | 12/1981 | Elsley et al. . |
| 4,312,669 | 1/1982 | Boffito et al. . |
| 4,332,401 | 6/1982 | Stephenson et al. . |
| 4,340,245 | 7/1982 | Stalder . |
| 4,350,673 | 9/1982 | Yamashita et al. . |
| 4,358,316 | 11/1982 | Liu et al. . |
| 4,375,843 | 3/1983 | Itzinger et al. . |
| 4,377,894 | 3/1983 | Yoshida . |
| 4,382,646 | 5/1983 | Sunde . |
| 4,396,211 | 8/1983 | McStravick et al. . |
| 4,397,834 | 8/1983 | Mendelsohn et al. . |
| 4,405,487 | 9/1983 | Harrah et al. . |
| 4,415,184 | 11/1983 | Stephenson et al. . |
| 4,431,561 | 2/1984 | Ovshinsky et al. . |
| 4,446,101 | 5/1984 | Bernauerr et al. . |
| 4,460,008 | 7/1984 | O'Leary et al. . |
| 4,470,188 | 9/1984 | Holbrook et al. . |
| 4,491,784 | 1/1985 | Flora et al. . |
| 4,516,520 | 5/1985 | Whaley . |
| 4,518,175 | 5/1985 | Richards et al. . |
| 4,526,408 | 7/1985 | Anderson . |
| 4,538,337 | 9/1985 | Holbrook et al. . |
| 4,538,422 | 9/1985 | Mount et al. . |
| 4,538,834 | 9/1985 | Brady et al. . |
| 4,621,838 | 11/1986 | Kneidel et al. . |

OTHER PUBLICATIONS

"The Effect of Surface Oxides on the Hydrogen Permeation through Steels," F. H. Heubaum and B. J. Berkowitz, *Scripta Metallurgica*, 1982, vol. 16, pp. 659–662.

"Hydrogen Permeation Characteristics of Aluminum–Coated and Aluminum–Modified Steels," *Journal of Nuclear Materials*, 88 (1980) pp. 168–173.

"Permeation and Outgassing of Vacuum Materials," W. G. Perkins, *J. Vac. Sci. Technol.*, vol. 10, No. 4, Jul./Aug., 1973, pp. 543–556.

"Hydrogen Permeation Characteristics of Some Austentitic and Nickel–Base Alloys," *Journal of Nuclear Materials*, 92 (1980), pp. 103–111.

"Non–Evaporable Getters Activatable at Low Temperatures," authors, publication and date are unknown.

"The Pumping of Methane by St707 at Low Temperatures," J.P. Hobson and R. Chapman, publication and date are unknown.

"Analysis of Hydrogen Permeation Experiments in 403 Stainless Steel," Barbara Okray Hall, Richard J. Jacko, and James A. Begley, publication and date unknown.

"Getters and Gettering," T. A. Giorgi, *Japan J. Appl. Phys. Suppl. 2*, Pt. 1 (1974), pp. 53–60.

"R&D Resources and Facilities," SAES Getters, author, publication, and date unknown.

"Over–all Heat Transfer Coefficients in Steam and Hot Water Injection Wells," G. Paul Willhite, *Journal of Petroleum Technology*, May, 1967, pp. 607–615.

"Improved Buttress–Thread Tubing," USS, *Instruction Manual for Licensed Manufacturers*, 1981, pp. 1–13.

Untitled manual for licensed manufacturers in threading, gaging, and inspecting buttress–thread tubing joints, author, publisher, and dates are unknown.

"High Vacuum Systems," Daryl L. Letham, *Machine Design*, Feb. 4, 1965 pp. 122–140.

SAES Advertising Brochure, Supplying The World. No Date.

New Gettering Alloys For High Intensity Discharge Lamps by Rabusin and Borghi, Apr. 9–12, 1979.

A Non Evaporable Low Temperature Activateable Getter Material by Boffito, et alApr. 1981 published in J. Vac. Sci. Technol.

Low Activation Temperature Negs SAES Advance Information published product brochure—Jan. 1981.

Outgassing Measurement Report To Babcock & Wilcox.—excerpts.

SAES Activation Efficiency as Function of Temperature on Time for CO with ST 707 dated Feb. 2, 1983.

Correspondence dated Feb. 10, 1983 transmitting Activation Table.

Deposition excerpts ofEdgar Stephenson of Jan. 1998, p. 1, 2, 22–48, 220–222.

Deposition excerpt of Michael Lombard of Feb. 1998, p. 1, 2, 18–21, 46.

Deposition of Livio Rosai of Mar. 1998.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–6 is confirmed.

New claims 7–13 are added and determined to be patentable.

*7. Apparatus for the delivery of hot fluids to a well containing a liquid hydrocarbon, said apparatus comprising:*
  *(a) an inner tubular having an outer surface and defining an inner space adapted for conveying fluids at a temperature within the range of about 400 to 700 degrees F.;*
  *(b) means for supplying fluid to said inner tubular within said temperature range which fluid supply means is connected to said inner tubular;*
  *(c) an outer tubular disposed around said inner tubular and defining an annular space therewith;*
  *(d) said inner and outer tubulars are composed of steel, exclusive of corrosion resistant coatings;*
  *(e) insulation disposed in said annular space;*
  *(f) means for connecting said inner and outer tubulars so that said annular space is closed to atmospheric pressure and a vacuum may be established in said closed annular space;*
  *(g) a getter material for absorbing at least one active gas in said closed annular space, said getter material is activatable at a temperature within said temperature range, said getter material is disposed in said closed annular space between said insulation and said outer surface of said inner tubular and adjacent said outer surface of said inner tubular, and said getter material includes at least one of the group consisting of: (I) titanium, (ii) an alloy of titanium, (iii) zirconium, and (iv) an alloy of zirconium, and*
  *(h) whereby the delivery of a hot fluid through the inner tubular causes said liquid hydrocarbon to flow.*

*8. Apparatus according to claim 7 wherein the liquid hydrocarbon is crude oil.*

*9. A method of maintaining a vacuum in the annular space of a tubular apparatus formed on an inner tubular which carries fluids at a temperature within the range of about 400 to 700 degrees F. and an outer tubular connected to the inner tubular by connector means to form the annular space between the inner and outer tubulars wherein the inner and outer tubulars are composed of steel, exclusive of corrosion resistant coatings, comprising:*
  *(a) closing the annular space to atmospheric pressure,*
  *(b) providing insulation in the annular space,*
  *(c) providing in said annular space adjacent an outer surface of said inner tubular and between said outer surface and said insulation a getter material, and*
  *(d) selecting said getter material from the group consisting of:*
    *(i) titanium,*
    *(ii) an alloy of titaniuim,*
    *(iii) zirconium, and*
    *(iv) an alloy of zirconium,*
    *which getter material is activatable at a temperature within said temperature range for absorbing active gasses which move into the annular space through hydrogen permeation of the outer tubular due to corrosion of the outer tubular and outgassing of the inner tubular due to the elevated temperature of the inner tubular, and*
  *(e) promoting the flow of oil at least partially in response to injection of the hot fluids, the hot fluids being injected through the inner tubular.*

*10. A method according to claim 9 further comprising injecting surface generated steam fluid in a continuous steam flood manner through the inner tubular.*

*11. A method according to claim 9 further comprising injecting surface generated steam in an intermittent huff and puff manner through the inner tubular.*

*12. A method according to claim 9 further comprising heating tar sands by the fluid in order to flow the oil.*

*13. A method according to claim 9 further comprising flowing the oil through the inner tubular.*

* * * * *